United States Patent
Sebastian et al.

(10) Patent No.: US 6,718,506 B1
(45) Date of Patent: Apr. 6, 2004

(54) HIGH SPEED DVD ERROR CORRECTION ENGINE

(75) Inventors: Jos Sebastian, San Jose, CA (US);
Chen-Chi Chou, Milpitas, CA (US)

(73) Assignee: Zoran Corporation, Sunnyvale, CA (US)

( * ) Notice: Subject to any disclaimer, the term of this patent is extended or adjusted under 35 U.S.C. 154(b) by 475 days.

(21) Appl. No.: 09/678,429

(22) Filed: Oct. 2, 2000

(51) Int. Cl.[7] ............................................. G11C 29/00
(52) U.S. Cl. ........................................ 714/763; 714/752
(58) Field of Search ................................ 714/784, 746, 714/769, 763, 781, 752, 785, 755, 786

(56) References Cited

U.S. PATENT DOCUMENTS

| | | | | |
|---|---|---|---|---|
| 6,079,046 A | * | 6/2000 | Tamura et al. | 714/781 |
| 6,158,040 A | * | 12/2000 | Ho | 714/770 |
| 6,292,921 B1 | * | 9/2001 | Daoudi et al. | 714/784 |
| 6,317,855 B1 | * | 11/2001 | Horibe | 714/752 |
| 6,446,233 B1 | * | 9/2002 | Dadurian | 714/752 |
| 6,470,473 B1 | * | 10/2002 | Iwasa | 714/785 |

OTHER PUBLICATIONS

Pioneer Corporation, "DVD Technical Guide—Chapter 2 Physical Format of Read–Only Discs" http://www.pioneer.co.jp/crdt/tech/dvd/2–3–e.html, printed Sep. 8, 2003.

* cited by examiner

Primary Examiner—Albert Decady
Assistant Examiner—Mujtaba Chaudry
(74) Attorney, Agent, or Firm—Townsend and Townsend and Crew LLP

(57) ABSTRACT

Speed of operation is increased in a DVD error correcting apparatus by first correcting rows of DVD data from PI check bytes in a PI engine and storing it in SRAM and feeding the corrected PI data into SDRAM and a PO engine, where only the syndromes are stored in an 8K SRAM, and only the bytes to be corrected are written to SDRAM. Speed of operation is enhanced by transferring most of the random and small burst of data to SRAM in big bursts with a minimum number of random accesses to the main SDRAM or DRAM.

9 Claims, 3 Drawing Sheets

ECC block configuration

|  | ← 172 bytes → | | | | PI ← 10 bytes → | |
|---|---|---|---|---|---|---|
| $B_{0,0}$  $B_{0,1}$ | | $B_{0,170}$ | $B_{0,171}$ | $B_{0,172}$ | | $B_{0,181}$ |
| $B_{1,0}$  $B_{1,1}$ | | $B_{1,170}$ | $B_{1,171}$ | $B_{1,172}$ | | $B_{1,181}$ |
| $B_{2,0}$  $B_{2,1}$ | | $B_{2,170}$ | $B_{2,171}$ | $B_{2,172}$ | | $B_{2,181}$ |
| | | | | | | |
| $B_{189,0}$  $B_{189,1}$ | | $B_{189,170}$ | $B_{189,171}$ | $B_{189,172}$ | | $B_{189,181}$ |
| $B_{190,0}$  $B_{190,1}$ | | $B_{190,170}$ | $B_{190,171}$ | $B_{190,172}$ | | $B_{190,181}$ |
| $B_{191,0}$  $B_{191,1}$ | | $B_{191,170}$ | $B_{191,171}$ | $B_{191,172}$ | | $B_{191,181}$ |
| $B_{192,0}$  $B_{192,1}$ | | $B_{192,170}$ | $B_{192,171}$ | $B_{192,172}$ | | $B_{192,181}$ |
| | | | | | | |
| $B_{207,0}$  $B_{207,1}$ | | $B_{207,170}$ | $B_{207,171}$ | $B_{207,172}$ | | $B_{207,181}$ |

192 rows, PO 16 rows

Decoding

Encoding

# HIGH SPEED DVD ERROR CORRECTION ENGINE

BACKGROUND OF THE INVENTION

This invention relates generally to error correcting apparatus for correcting errors in digital data, and more particularly the invention relates to apparatus for correcting errors in digital video disk (DVD) formatted data.

Digital data typically has an error code associated with bytes (8 bits) of data for error check and correction. DVD data in an ECC block configuration has a unique data structure in which bytes (16 bits per byte) are stored in 208 rows with 182 columns. See FIG. 1. Each row has 10 check bytes for inside parity (PI). Therefore, 10 columns of the 182 are dedicated to check bytes. Similarly, 16 rows are provided for check bytes for outside parity (PO) with the 16 rows being interleaved with 192 data rows or one row of check bytes after each 12 data rows.

Received DVD data must be checked for errors and corrected before storage for later use. FIG. 2 is a functional block diagram of DVD error correction apparatus in accordance with the prior art. As shown, input data is fed directly to a dram 10 and to a Pi engine 12 which corrects errors based on PI check bytes and the corrected bytes are written to DRAM. The PI corrected data from DRAM 10 is then read by the PO engine 14 which generates syndromes for PO correction bytes and are written back to DRAM 10 and correction is done based on the outside parity (PO) bytes. Thus, in accordance with the prior art a large DRAM 10 must be provided for storing all of the partially corrected data, and then the partially corrected data must be retrieved from DRAM 10 for use by the PO engine. Thereafter, the PO corrected data is reapplied to DRAM 10 for storage. Since PO calculations are based on columns, burst accesses are reduced and thereby speed is reduced. This architecture can support only a maximum data rate of 8 times the DVD speed and this requires very fast SDRAMS or DRAMS and the synthesizing to high frequency. One alternative would be to use huge internal SRAMS (37–74 Kbytes) or even more but this would be a costly solution. Further, since higher speeds like 16× and above with less cost will be required in the future, and new architecture is required.

SUMMARY OF THE INVENTION

In accordance with the invention, accesses to processed data in SDRAM memory for PO error correction is minimized by employing a scratch pad SRAM memory for storing syndromes calculated by the PO engine which are later used to further correct the processed data after all rows of data are read and PO syndromes are calculated. The PO engine can then identify incorrect data from the syndromes and correct the stored processed data on a random basis.

More particularly, the PO syndromes can be calculated for columns of PI processed data as the PI corrections are being made on rows of DVD data in an ECC block. Unlike the prior art, the PI engine and the PO engine can be operating concurrently on data from the same ECC block.

In a preferred embodiment, 8K SRAM memory is used for the scratch pad internal memory for the PO engine thereby reducing costs. SDRAMs are used for storing the processed data, this architecture is expandable to higher speeds, and more error correction capability can be introduced with the implementation of reiterative error correction.

The invention and objects and features thereof will be more readily apparent from the following detailed description and appended claims when taken with the drawings.

DESCRIPTION OF ILLUSTRATIVE EMBODIMENT

Figures 1, 2:
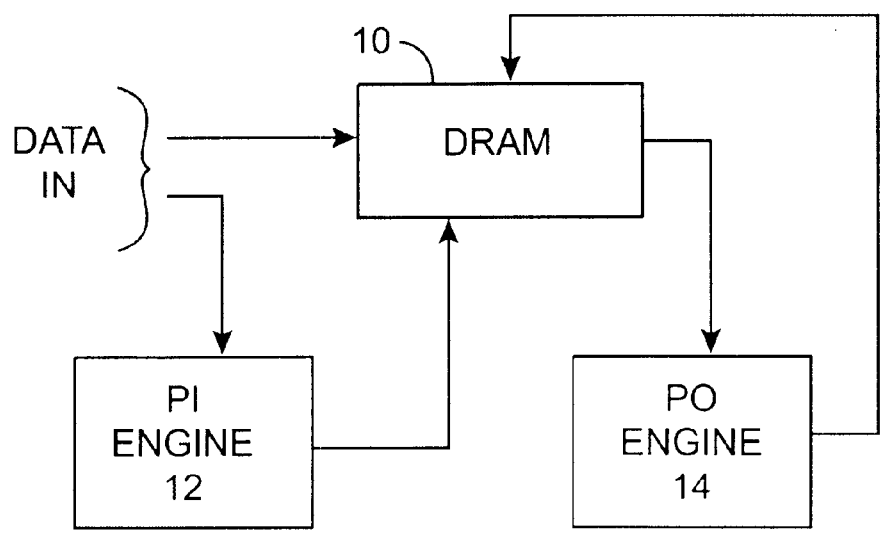
FIG. 1 is a diagram illustrating DVD formatted data.
FIG. 2 is a functional block diagram of DVD error correction apparatus in accordance with the prior art.
Figure 3:
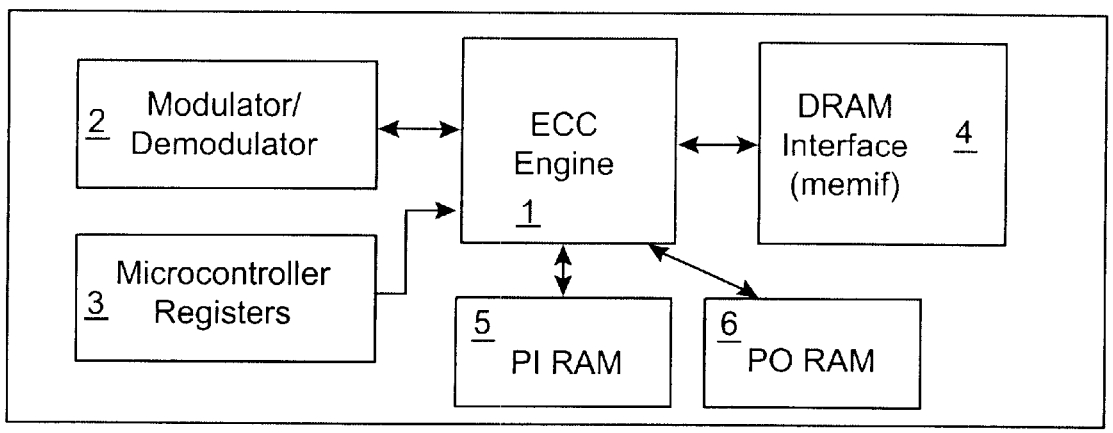
FIG. 3 is a block diagram of a DVD error correction engine.

FIG. 3 is a functional block diagram of a DVD error correction engine and includes the ECC engine 1 to which is coupled a modulator/demodulator 2, microprocessor registers 3, a DRAM interface 4, PI Ram 5, and PO Ram 6. Engine 1 uses known error correcting algorithms and syndromes for inserting PI (10) and PO (16) check bytes while encoding DVD data. When decoding DVD data, 5 errors (or 10 erasures) can be corrected in the PI side, and 8 errors (or 16 erasures) can be corrected in the PO side.

Figure 4:
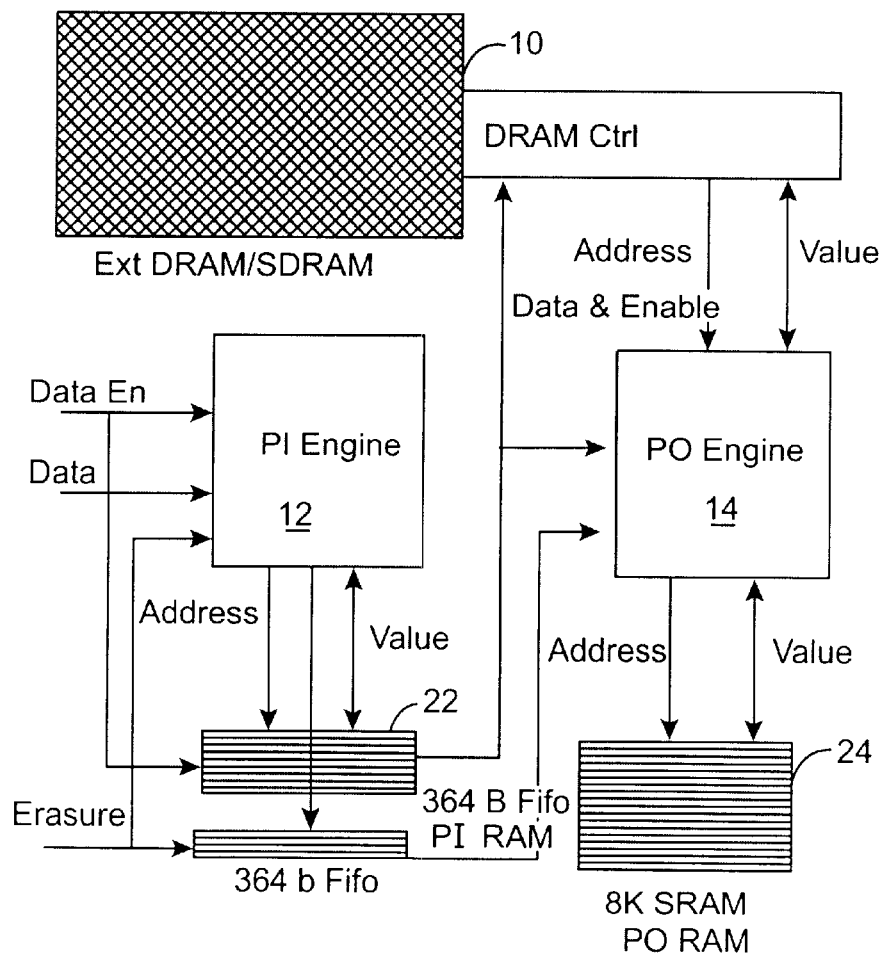
FIG. 4 is a functional block diagram of DVD error correction apparatus in accordance with an embodiment of the present invention.

FIG. 4 is a functional block diagram of DVD error correction apparatus in accordance with a preferred embodiment of the invention. In this embodiment sequential rows of data along with the data enable signal and erasure are applied to PI engine 12, and PI engine 12 calculates the location and value of errors in rows based on the PI parity bytes. The input data is also applied to a scratch pad memory 22 where the rows of data are corrected based on the PI parity code from PI engine 12, and then the rows of PI corrected data are fed concurrently to SDRAM 10 and to PO engine 14.

Briefly, the PI corrected data from the first scratch pad memory 22 is applied to PO engine 14, and PO engine 14 calculates the syndromes defining the PO parity bytes from columns of the PI corrected data, which are stored in a second scratch pad memory 24. Both scratch pad memories are SRAM memory with memory 24 comprising 8 Kbyte capacity. The PO syndromes must be retained in scratch pad 24 until all rows of data are received from the first scratch pad memory 22 and are processed by column by PO engine 14, whereupon the previously PI corrected data in DRAM memory 10 is corrected for PO parity error location and value on a random access basis. The PO syndromes are used in an error location polynomial (ELP) and in an error value polynomial (EVP) to identify corrections. Thus, the data initially stored in SDRAM 10 need not be retrieved for use by PO engine 14, but rather only the bytes which must be corrected for PO parity are accessed and corrected.

Scratch pad memory 24 must be of sufficient size to store all syndromes for one ECC block of DVD data which are required for correcting the stored data based on PO parity. Thereafter, the syndromes for the corrected block of data can be erased and the SRAM used for storing syndromes for the next block of data. Since the following block of data will be partially processed before the syndromes for the previous block of data can be erased, memory 24 must be sufficiently large to store all PO syndromes for one block and a portion of the syndromes for the following block of DVD data. Thus, memory 24 is recycled as succeeding blocks of DVD data are received and processed.

The use of SRAM for the scratch pad memories for the PI engine and the use of syndrome storage in SRAM for the PO engine reduces costs and further allows higher speeds (e.g. 16×). The architecture is readily expandable to higher speeds and more error correction capability with the implementation of reiterative error correction.

A more detailed description of the DVD decoder operation and the DVD encoder operation will now be given.

DVD Decoder Operation

The data from demodulator 2 is supported with the enable that comes along with it, called PI input data and PI input data enable respectively. Erasure information is also fed from the demodulator.

First is the PI correction, PI correction is done on the fly. The data (PI input data) received from demodulator is not stored in DRAM, as in the prior art design, but instead is stored in a FIFO/Small dual port SRAM, PI RAM 22. This can store a few lines of PI input data, which is typically 2 or 3. Three lines of PI input data storage permit higher DVD speeds. The erasure information is stored in a buffer for later use. The PI input data along with its enable and erasure information is not only stored in the PI RAM but also processed inside by the PI error correction engine. The PI correction engine will compute the errors and erasures.

For correcting the bytes, the PI correction engine reads from PI RAM 5 the byte to be corrected, corrects the bytes and writes it back to the same location. Erasure bit is also modified to reflect the correction. If no correction is made, neither erasure bits nor data are touched.

The PI corrected data is sent to DRAM/SDRAM 10 as well as to the PO Correction Engine 14. PO Engine 14 receives the PI corrected data along with its enable and PI adjusted erasure information. This will have locations marked as erasures for each byte in the rows after PI correction. Total number of erasures marked for this PI corrected data will be less than or equal to the erasures marked by the demodulator to the PI input data. By this, one can see that erasure information is present for every byte of PO data (PI corrected data), which means that the PO engine can use this information to create better syndromes and thereby increase the error correcting capability. If a row is found to be uncorrectable, in the prior art design, the whole row is marked as erasure, since the prior art design uses only row-erasures, not byte-erasures, as in the present invention.

Also, in the prior art design, PO processing is skipped, if
a) there are no errors/erasures reported by PI for PO to be corrected.
b) the total number of PI row erasures is greater than 16.

In the present invention, PO is continuously running, as there is no waiting for PI to completely finish one ECC block. There is only a delay for PI to finish one row. By making PO run continuously, we can correct any errors which PI miscorrects, which is not done in the prior art design, as PI will not report errors/erasures after it miscorrects. Also if there are more than 10 erasures in, say 17 rows of PI, but not in the same column, in the previous design, the prior art skips as the PO cannot correct as it reports 17 row erasures. But in this present invention, an error like that will be surely corrected. The only condition uncorrectable by this engine is when there are more than 10 erasures/5 errors in a row of PI, and in the same column these errors are reported, there are more than 16 erasures/8 errors.

The PI corrected data enable from PI is used to support PI corrected data, since this data is huge for storage and processing, in this architecture, the PO engine writes PO syndromes to PO RAM and uses it later for PO correction.

For the first and thirteenth row in an ECC block, the PI corrected data is read and syndromes are calculated and written to PO RAM in the next clock cycle. One clock cycle delayed version of PI corrected data-enable is used to write the syndromes to PO RAM. Except for the first and thirteenth row of PI data, this PI corrected data-enable is used for another purpose also. It is used to fetch previously written syndromes (called Partial PO Syndromes (PPOS)) from PO RAM. This is processed along with the incoming data, and new PPOS is generated. PO has 16 bytes of syndromes for each column of data, and is updated by arrival of each byte. PO RAM has a bus-width of data bus as 128 bit (16 bytes). During PI data-enable (except for 1st and 13th rows), 16 bytes of syndrome are read along with incoming data, and the Partial PO syndromes (PPOS) are recalculated and written back in the next clock cycle to PO SRAM in the same location. PO RAM is dual port SRAM, and one port is used for this. Since two clock cycles are minimum required spaced apart from next data, this is the maximum data rate.

| | |
|---|---|
| At 1 × speed, DVD read channel clock | = 26.16 Mb/s |
| Number of bits in one frame of data | = 1488 bits |
| Number of PI input data bytes per frame | = 91 Bytes |
| Targeted speed for DVD | = 20× |
| Operating frequency of ECC Engine & SDRAM | = 98.1 MHz |
| Therefore, number of clock cycles between each byte of PO input data | = $\frac{(16 \times 98.1)}{(26.16 \times 20)}$ |
| | = 3 |

So 20× of DVD speed meets our requirement, as we get 3 clock cycles for each data, and we require 2.

Partial PO syndromes are divided into two types:
a) Primary Partial PO syndromes (PPPOS)
b) Secondary Partial PO syndromes (SPPOS)

PO Engine 14 does correction on 172 columns of PO data. And of course, there are 208 rows, and every 13th or multiple-of-13th row in an ECC Block are the PO Check bytes. PO syndromes are calculated by two syndrome generators in the PO Engine viz., primary and secondary. Primary syndrome generator calculates Partial PO syndromes for 192 rows (excluding 13th or multiple-of-13 rows in the 208 rows of PI corrected data) and Secondary syndrome generator calculates Partial PO syndromes for every 13th or a multiple-of-13 rows of PI corrected data. These are respectively called PPPOS and SPPOS. These are stored at separate locations in PO RAM.

At the end of 207 rows of PI Corrected data, there will be 172×16 bytes of PPPOS. These syndromes are multiplied with a $\alpha^{16n}$ and added with newly calculated SPPOS from the 208th row of uncoming data, and written to the same location as PPPOS in PO RAM, called Completed PO Syndromes (CPOS). SPPOS location of first ECC block is reused as PPPOS area for second ECC block and so on.

While calculating PPPOS and SPPOS for next ECC block PO engine 14 also reads from PO RAM 24, the CPOS and corrects the data in DRAM/SDRAM 10.

DVD Encoder Operation

For DVD Encoder, the raw data (192×172 bytes) after EDC check byte insertion, is read from DRAM/SDRAM 10. 172 bytes are read from the DRAM/SDRAM and fed to the PI engine 12, which could be reused for check byte generation. The generated check bytes are appended and the whole data (182 bytes) are sent to DRAM 10, to a scratch area. After every 12th row is written to DRAM/SDRAM, there will be a row jump of 182 bytes in the write address of DRAM/SDRAM. After 192 row of raw data, PI check byte generation is paused until PO check bytes are calculated, and after that PI check byte generation of these PO check bytes are done. The 16 PO check byte rows (with its PI check bytes) are written to the skipped location, i.e., every 13th and multiple of 13th row in DRAM/SDRAM. Next ECC block will be started processing only after the PI Check Bytes are calculated for the entire 208 rows.

While the data is read for PI check byte generation, it is also read for PO check byte generation. For each data coming in, 16 Partial Check Bytes are calculated after reading from PO RAM, and written after calculation to PO RAM. At the end of one ECC block (192 rows of raw data), SRAM will have 172×16 Completed Check bytes. 172 bytes of them are taken, PI check byte calculated and written in 13th or multiple-of-13 rows, as 182 byte information, in the scratch area. Once an ECC block is completed, it is sent to modulator depending on the request from the modulator.

Figure 5A:
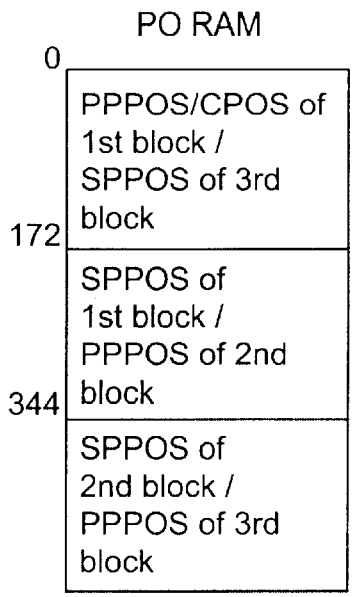
FIGS. 5A, 5B illustrate the layout for PO RAM and DRAM/SDRAM during decoding.
Figure 5B:
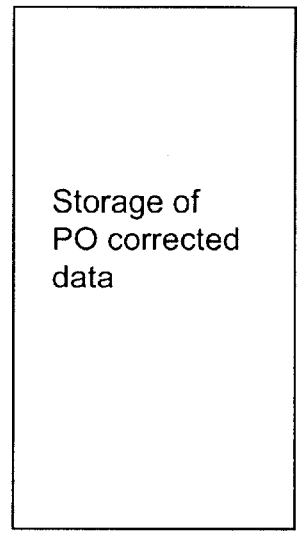
Figure 5C:
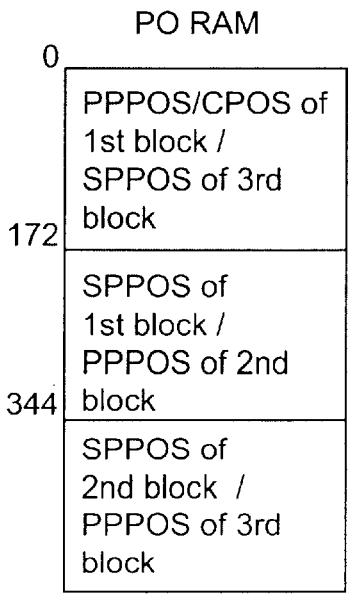
FIGS. 5C, 5D illustrate layout for PO RAM and DRAM/SRAM during encoding.
Figure 5D:
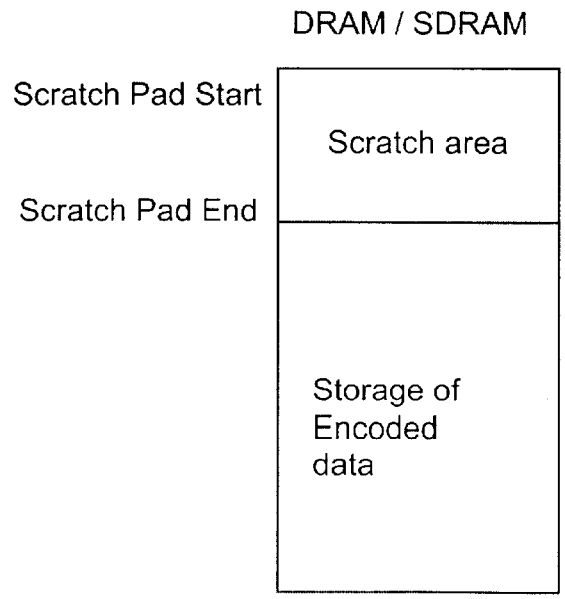

The layout of PO Ram 24 and RAM/SDRAM 10 during decoding is given in FIGS. 5A, 5B, and the layout during encoding is given in FIGS. 5C, 5D. PO RAM continually reuses portions of its memory in a rolling fashion, while the DRAM/SRAM stores PO corrected data or encoded data with a scratch area, as described above.

The architecture in accordance with the invention can be upgraded to support a new feature called re-iterative ECC (RECC). In RECC, horizontal (PI) and vertical (PO) error correction are implemented again, until all errors are corrected. In practice, there will be only limited number of loops of correction, since DRAM bandwidth has also to be considered.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. DVD error correcting apparatus comprising:
   a first engine that receives rows of DVD bytes,
   a first scratch pad memory that receives the rows of DVD bytes concurrently with the first engine, the first engine correcting inside parity errors (PI) in the rows of DVD bytes stored in the first scratch pad memory based on an error location and value calculated by the first engine
   a memory that receives corrected rows of DVD bytes from the first scratch pad memory, the corrected rows of DVD bytes including check byte rows for outside parity that are interleaved with data rows,
   a second scratch pad memory, and
   a second engine that receives the corrected rows of DVD bytes, calculates primary partial outside parity (PO) syndromes for the data rows, and calculates secondary partial PO syndromes for the check byte rows,
   wherein the second engine stores the primary and the secondary partial PO syndromes in separate locations in the second scratch pad memory in a non-interleaved format, and wherein the second engine randomly accesses the DVD bytes in the memory for error correction.

2. The DVD error correcting apparatus as defined by claim 1 wherein the memory comprises DRAM devices, and the scratch pad memories comprise SRAM devices.

3. The DVD error correcting apparatus as defined by claim 2 wherein the second scratch pad memory comprises 8 K of SRAM memory.

4. The DVD error correcting apparatus as defined by claim 3 wherein the first engine receives erasure signals for erasing rows of data in response to an external signal.

5. The DVD error correcting apparatus as defined by claim 1 wherein the first engine receives erasure signals for erasing rows of data in response to an external signal.

6. A method of correcting DVD bytes using inside parity (PI) and outside parity (PO) codes comprising the steps of:
   a) receiving rows of DVD bytes in error correcting code (ECC) block format,
   b) calculating PI code for each row of DVD bytes,
   c) correcting each row of DVD bytes based on the PI code,
   d) storing the PI code corrected rows of DVD bytes in a memory, the correct rows of DVD bytes including check byte rows interleaved between data rows,
   e) calculating primary partial PO syndromes for the data rows and secondary partial PO syndromes for the check byte rows,
   f) storing the primary partial PO syndromes in a first memory address range, and storing the secondary partial PO syndromes in a second memory address range outside the first memory address range, until all the rows of DVD bytes in and ECC block are processed, and
   g) correcting the PI code corrected rows of DVD bytes stored in the memory using the primary and secondary partial PO syndromes.

7. The DVD error correcting apparatus as defined by claim 1 wherein the DVD data is in error correcting code (ECC) block format and the second engine stores the primary and secondary partial PO syndromes for all of the rows of DVD data contained in an ECC block in the second scratch pad memory before the second engine calculates the primary and secondary partial PO syndromes for a subsequent one of the ECC blocks.

8. The method of correcting DVD data of claim 6 wherein all the primary and secondary partial syndromes for PO code associated with an ECC block are stored prior to calculating the primary and secondary partial syndromes for PO code associated with a subsequent one of the ECC blocks.

9. A DVD error correcting apparatus adapted for receiving DVD bytes and correcting errors in said DVD bytes comprising:
   a first scratch pad memory for receiving rows of DVD) bytes;
   a first engine for receiving said rows of DVD bytes, calculating inside parity (PI) syndromes for said rows of DVD bytes, determining a location and a value of PI errors, and correcting said PI errors;
   a memory for receiving corrected rows of DVD bytes that include check byte rows interleaved between data rows;
   a second scratch pad memory; and
   a second engine for receiving said corrected rows of DVD bytes, calculating primary partial outside parity (PO) syndromes for the data rows of the DVD bytes,
   calculating secondary partial PO syndromes for the check byte rows of the DVD bytes,
   storing said primary partial PO syndromes and said secondary partial PO syndromes in said second scratch pad memory in a non-interleaved format, and
   randomly accessing said DVD bytes in said memory for error correction.

* * * * *